United States Patent [19]

Volkner et al.

[11] 4,036,457

[45] July 19, 1977

[54] AIRCRAFT DE-ICING

[75] Inventors: Wolfgang Volkner, Rellingen; Hellmuth Schmedemann, Tornesch, both of Germany

[73] Assignee: Licentia Patent-Verwaltungs-G.m.b.H., Frankfurt am Main, Germany

[21] Appl. No.: 611,270

[22] Filed: Sept. 8, 1975

[30] Foreign Application Priority Data

Sept. 10, 1974 Germany .............................. 2443224

[51] Int. Cl.² ............................................. B64D 15/14
[52] U.S. Cl. ................................ 244/134 D; 219/209; 340/234
[58] Field of Search ............ 244/134 D, 134 R, 134 F; 73/336.5; 219/201, 209, 486; 340/234; 200/61.06

[56] References Cited

U.S. PATENT DOCUMENTS

| | | | |
|---|---|---|---|
| 3,287,974 | 11/1966 | Ciemochowski | 244/134 F X |
| 3,453,415 | 7/1969 | Hermes et al. | 219/486 |

FOREIGN PATENT DOCUMENTS

1,053,734   1/1967   United Kingdom ............. 244/134 F

Primary Examiner—Trygve M. Blix
Assistant Examiner—Barry L. Kelmachter
Attorney, Agent, or Firm—Spencer & Kaye

[57] ABSTRACT

In a method for de-icing aircraft surfaces by means of a plurality of electrical resistance heaters which are sequentially supplied with heating current, the delivery of current to each heater being effectuated during a succession of cycles each constituted by a heating period during which heating current is supplied to the heater and a nonheating period during which no current is supplied to the heater, thereby controlling the average current supplied to the heater, the range of ice accumulation rates to which the de-icing process can adjust is enlarged by controlling the duration of the heating periods in dependence on the temperature at the resistance heaters and by controlling the duration of the nonheating periods in dependence on the water content of the atmosphere surrounding the aircraft.

4 Claims, 6 Drawing Figures

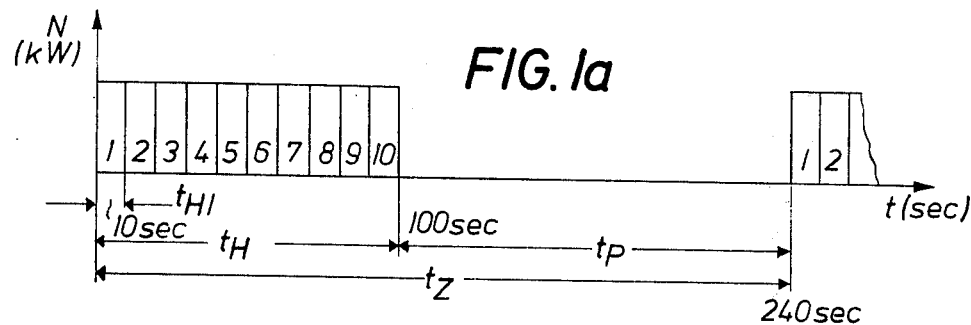
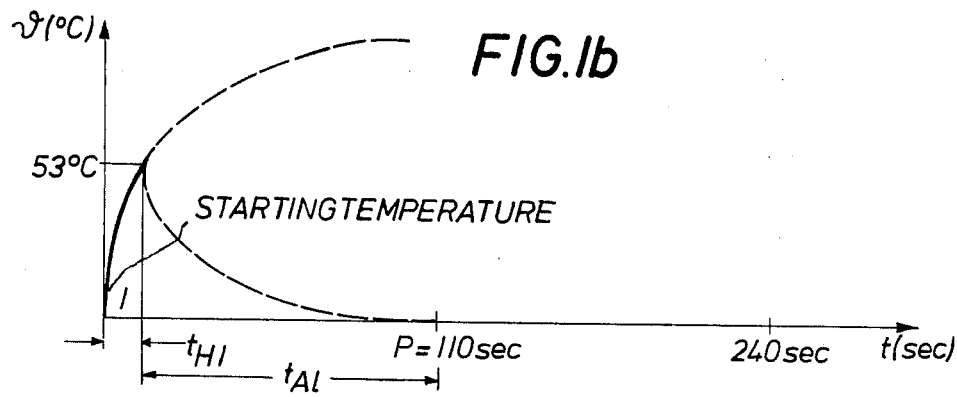
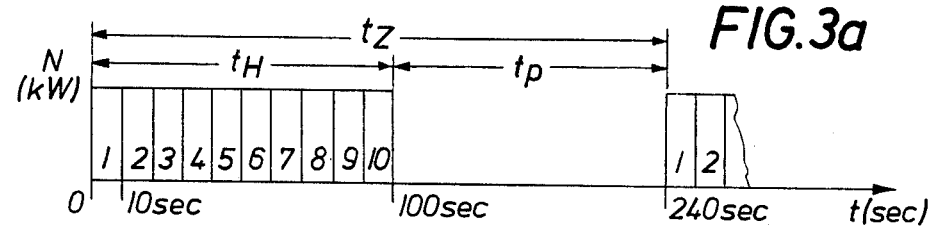
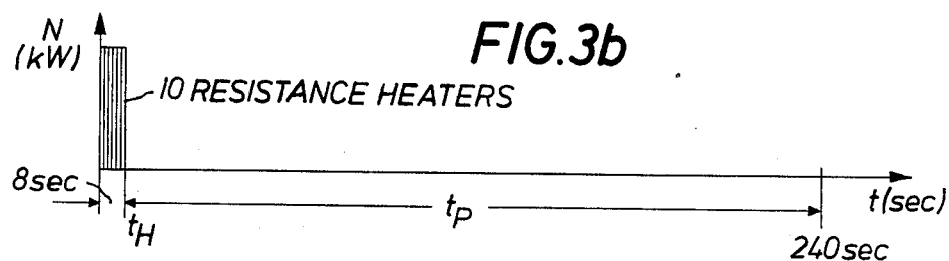
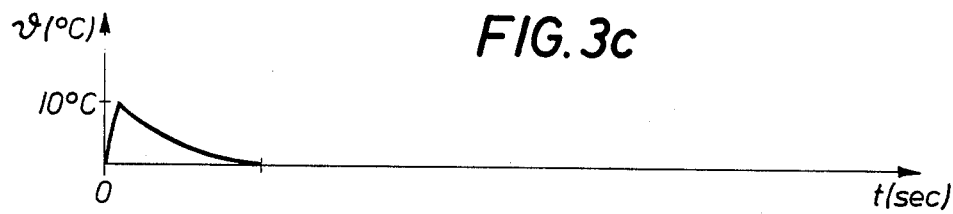

AIRCRAFT DE-ICING

BACKGROUND OF THE INVENTION

The present invention relates to a method for de-icing the engine, wing and empennage systems, or control surfaces, of aircraft utilizing electrical resistance heaters which are supplied with heating energy in succession, the quantity of the heating energy fed to the resistance heaters being controlled by establishing heating and nonheating periods.

It is known to energize the resistance heaters disposed at the surfaces to be de-iced in a continuous manner until the ice present at these surfaces has been completely melted. The drawback of this process is that excess heat supplied and/or stored in the heating elements as well as the flow of air lead to a flow of the water thus formed back over unheated surfaces, resulting in renewed, and uncontrollable, ice formation.

This drawback is avoided by another known electrothermal de-icing proces in that the electrical resistance heaters are heated in succession only for short periods. This merely melts the adhesion layer between the ice and the aircraft structure so that the ice pieces which then float on the surface of the aircraft structure are removed by the centrifugal and/or aerodynamic forces occurring during flight. With this process it is thus possible to de-ice completely the engine, wing and empennage systems of aircraft.

A de-icing system operating according to the last-mentioned process is disclosed in U.S. Pat. No. 3,420,476, issued to Wolfgang Volkner et al on Jan. 7, 1969. In this system the heat required for de-icing is generated in electrical resistance heaters which are arranged in groups, some of the resistance heaters being constantly provided with heating energy and other resistance heaters of the same group being supplied with heating energy for short intervals in succession and in a defined sequence. A first clock pulse generator with a given constant clock pulse frequency generates energizing pulses for those resistance heaters which are to be temporarily supplied with heating energy while a second clock pulse generator furnishes de-energizing signals, or pulses, between every two successive energizing pulses at a time which depends on the temperature of one of the resistance heaters. In order to control the de-energizing signals, the temperature at the surface of one of the constantly energized resistance heaters is used.

In this known de-icing system, temperature sensors disposed in the constantly heated strips where the ice breaks off or at the surface of the resistance heaters embedded in these strips make it possible to monitor the environmental conditions such as temperature, air pressure, humidity and relative velocity of the air streams at the surfaces to be de-iced and their effect on the temperature of the heating mats and the heating strips.

FIGS. 1a and 1b of the accompanying drawing illustrate a heating sequence in the form of a timing diagram and a temperature vs. time curve, respectively, for a known de-icing system including a total of ten resistance heaters 1 to 10. Referring to FIG. 1a, the heating time, $t_H$, under environmental conditions which are not explained in detail, is assumed to be 100 seconds for all ten resistance heaters, each heater 1-10 thus having a heating time, $T_{Hn}$, where n is the reference numeral identifying the particular element, of 10 seconds, while a nonheating time, $t_p$, of 140 seconds is provided. The cycle time, $t_z$, is thus 240 seconds. When the environmental conditions change, the cycle time can be lengthened or shortened to correspond to such changes by lengthening or shortening the nonheating time $t_p$. This is effected in the known de-icing system by a manual adjustment made by the pilot. However, it is extremely difficult for the pilot to accurately adapt the nonheating period to the environmental conditions since he must perform a number of additional tasks, particularly at a time when the environmental conditions are changing.

FIG. 1b shows the temperature behavior at the resistance heater 1, which also applies for the subsequent resistance heaters 2 to 10. Resistor 1 is heated as well as cooled according to an exponential function, FIG. 1b showing the temperature curve for the heating time $t_{H1}$ as a solid line and the temperature curve for the cooling period as a descending dashed line. Experiments have shown that in the extreme case a heating period $t_{H1}$ of 10 seconds creates a rise in temperature of approximately 53° C on the surface of resistance heater 1 while the cooling period $t_{A1}$ required to return to the starting temperature then is about 100 seconds so that the resistor will have reached its starting temperature again after a period, P, of about 110 seconds from the start of heating. The point of intersection of the temperature curve for the cooling period of the resistor with the time axis is at P.

It is generally known that the amount of water present in the atmosphere, with the smallest water particles being able to be cooled to about −43° C and suddenly turning to ice if there is a change in their surface tension to thus produce critical icing on aircraft, principally depends on the temperature, type of clouds, size of the field of clouds and size of the water droplets in the clouds. Thus, for example, at a temperature of 0° C a stratus cloud may contain 0.06 g water per $m^3$ and a cumulus cloud 3.84 g water per $m^3$. It has also been found by way of flight experiments that temperatures between +5° C and +10° C are required on the surface of a helicopter rotor blade to melt the adhesive layer between the ice and the surface, according to the above-described process, so that whole ice pieces can be removed as a result of centrifugal and/or aerodynamic forces.

The momentarily existing meteorological conditions thus determine the cooled liquid water content and thus, with sufficiently constant flow speed at the engine, wing and empennage systems of the aircraft, the ice accumulation rate.

In the example depicted by FIGS. 1a and 1b, tripling of the ice accumulation rate would have the result that the mass of ice permissible on the aircraft surfaces would be exceeded since the heating period can be extended only by 240/100 = 2.4 < 3. On the other hand, a rising ambient temperature, and thus a rise in the starting temperature, would result in a shift of the point of intersection P to after the beginning of a new heating cycle. In the known de-icing system this would result in a progressive increase in the temperature at a heating resistance until the ice would melt continuously and renewed uncontrollable ice formation could develop on the unheated surfaces.

SUMMARY OF THE INVENTION

It is therefore an object of the present invention to provide a process for de-icing the engine, wing and empennage systems of aircraft which not only has one or a plurality of operating points but which can also be used over a broad range.

This and other objects are accomplished according to the present invention by controlling the heating period at the resistance heaters in dependence on the temperature present at the resistors, which is determined by means of temperature sensors, and by controlling the nonheating period in a heating cycle in dependence on the amount, or concentration, of water in the atmosphere. In order to determine this amount of water, it is possible to use ice warning systems, for example an "Ice Severity Meter" in conjunction with an ice warning sensor made by the firm Rosemount. Such an ice warning system is described in the Aeronautical Short Form Catalogue E 8688 of Messrs. Rosemount Engineering Company Limited, England. This catalogue, in Section 3 on pages 3 and 4 thereof, describes the individual components of such a system and explains the connection of these components.

One advantage of the present invention, in addition to its broader range of use, is that optimum de-icing of the aircraft systems is assured under changing meteorological environmental conditions. An automatic program control is an aid to the pilot and also excludes pilot errors in connection with programming. Further advantages of the invention are that its practice requires a minimum of electrical energy and effectively protects the resistance heaters against overheating.

In one embodiment of the present invention resistance heaters are used which are mainly fastened on the surfaces of helicopter rotor blades and the information relating to temperatures is transmitted by means of coded electrical signals with the aid of the heating current supply lines. This advantageously leads to relatively low construction and material costs since it is only necessary to provide a pair of slip rings on the rotor shaft.

BRIEF DESCRIPTION OF THE DRAWING

FIG. 1a and 1b are diagrams illustrating the principles of operation of de-icing systems and have already been described in detail.

FIGS. 3a, 3b and 3c are timing diagrams illustrating the operation of the circuit of FIG. 2.

DESCRIPTION OF THE PREFERRED EMBODIMENTS

Figure 2:
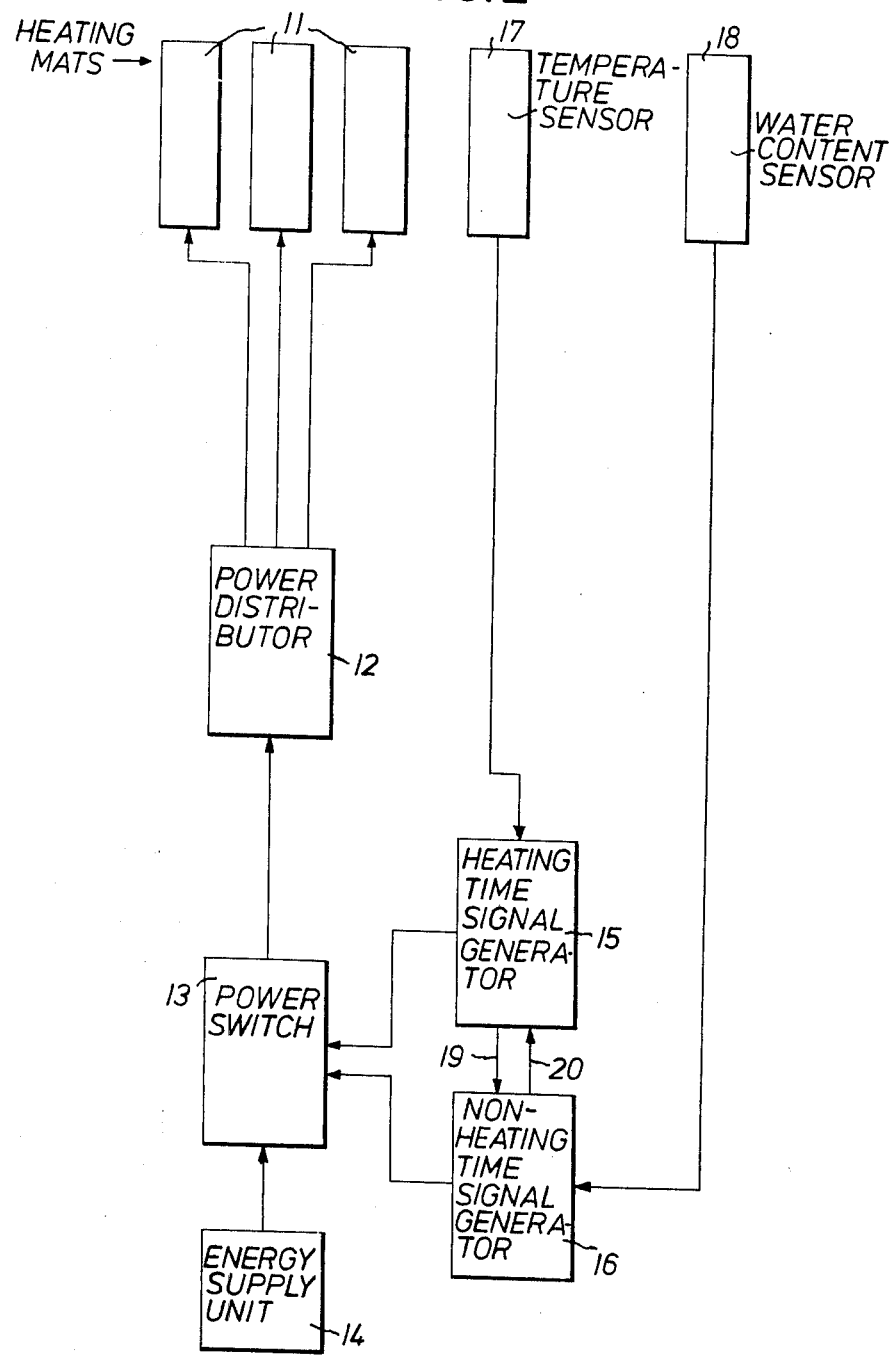
FIG. 2 is a block circuit diagram of a device for practicing the method according to the invention.

The device shown in FIG. 2 includes a total of ten heating mats 11 of which only three are shown for the sake of simplicity. Each heating mat 11 includes a resistance heater (not shown in detail) and is fastened on an aircraft surface which is to be de-iced. The heating energy for the resistance heaters is supplied via a power distributor 12 and a power switch 13 from an energy supply unit 14. For this purpose the power switch 13 is switched on for a period of time determined by the output from a heating time signal generator 15 and switched off for a period of time determined by output pulses from a nonheating time signal generator 16. The number of switch-on instructions during each heating time, $t_H$, corresponds to the number of resistance heaters.

While the switch-on duration depends on the temperature at the resistance heaters, which is determined with the aid of a temperature sensor 17, the nonheating time generator 16 emits a signal for the nonheating time interval in dependence on the quantity of water present in the atmosphere, which quantity is measured by a water content sensor 18. Conventional units as water content sensor are out of the question, since the water drops, on impinging upon the measuring sensor, would abruptly freeze to ice. It is for this reason that, as mentioned above, the unit 18 should be constituted by an ice warning system of the type described in Section 3.1.1 on page 3 of the above-cited Rosemount catalogue.

The resistance heaters in the heating mats 11 are supplied in succession with heating energy when a switch-on instruction is present at power switch 13, the power distributor 12 switching automatically to the next-succeeding resistance heater upon the occurrence of a new switch-on instruction. It is also possible, however, to control the power distributor 12 directly from the heating time generator 15.

After the last heating clock pulse in a heating cycle, the nonheating time generator 16 receives a signal from the heating time generator 15 via line 19 which causes the nonheating time generator 16 to furnish a switch-off instruction to power switch 13 for the duration of a nonheating interval period, $t_p$, the duration of which depends on the quantity of water present in the atmosphere. The power switch 13 is then blocked for the duration of the nonheating period so that the resistance heaters in the heating mats 11 will not be supplied with energy.

Upon completion of the nonheating period, the nonheating time generator 16 emits a signal to the heating time generator 15 via line 20 to initiate delivery of another series of switch-on instructions to power switch 13 so that the resistance heaters are again supplied with energy.

FIG. 3a is a graphic representation of one cycle of operation of the above-described embodiment, it being assumed that the cycle period $t_z$ is 240 seconds as in the operating cycle shown in FIG. 1a, and the nonheating period $t_p$ is 140 seconds, a heating time of ten seconds being provided for each resistance heater. If now the heating time for each resistance heater is reduced in dependence on a temperature measurement by temperature sensor 17, e.g., to 0.8 seconds, an operating cycle as shown in FIG. 3b will result. The heating time $t_H$ is then 8 seconds so that the interval period must be increased to 232 seconds to maintain a cycle period $t_z$ of 240 seconds.

The temperature curve for one resistance heater is shown in FIG. 3c where the switch-on instruction to each heater produces a maximum temperature of 10° C. This temperature is sufficient in order to melt the adhesion layer between the ice and the aircraft surface which is to be de-iced so that the heating operation can be stopped after obtaining this temperature value. The rise in temperature of 53° C for the extreme case shown in FIG. 1b, is not required due to de-icing technical reasons.

Whereas in the embodiment shown in FIG. 3a it is only possible to adjust the heating for an increase by a factor of up to 2.4 in the ice accumulation rate, an embodiment having the performance characteristic shown in FIG. 3b can adjust to an increase up to a factor of 240/8 = 30. A reduction of the nonheating period $t_p$ to, for example, 72 seconds permits adjustment to a further increase in the ice accumulation rate by the factor 10. A reduction of the nonheating period is generally required at a higher rather than a lower environmental temperature, because the water content in the air decreases as the temperature decreases in the range below 0° C. For example, it can be sensible, to use at an environmental temperature of −20° C a long cycle time tz with a long nonheating time tp, whereas this nonheating time must be reduced at a −5° C environmental temperature in order to ensure a complete de-icing of the increased ice deposit on the aircraft surface which is to be de-iced. This shows that it is possible with a heating time generator 15 which is freely programmed in dependence on the surface temperature of a resistance heater and with the simultaneous use of an interval time generator 16 which is freely programmable from an ice warning system to de-ice the engine, wing and empennage systems of aircraft in a manner adapted to a wide range of changing meteorological environmental conditions.

For the units shown in the block circuit diagram according to FIG. 2, conventional components may be used. For instance, the power distributor 12 shown in FIG. 2 can be replaced by the wiring arrangement shown in FIG. 2 of U.S. Pat. No. 3,453,445; the power switch 13 can be replaced by the controlled rectifier circuit 12 shown in FIG. 1 of that U.S. -Patent; the energy supply unit 14 can be replaced by the three-phase alternator 10 of the patent. As heating time signal generator 15 and as nonheating time signal generator 16 integrated module units can be used. For instance, the module unit XR - 220/320 of Messrs. Gonda Elektronik GmbH., Stuttgart, Germany, would be suitable, which for instance is depicted in FIG. 17 in a prospectus of the same wording and in a prospectus published in November 1972.

The temperature sensor 17 and the water content sensor 18, respectively, are designed as threshold value switches which operate at preselected values. The switching signals supplied by these cause no change of the time intervals of the output signals of the heating time signal generator 15 and the nonheating time signal generator 16, respectively, and indeed at higher temperatures and larger water quantities in the air the heating times are cut off or a reduction of the nonheating time is effected, respectively.

It will be understood that the above description of the present invention is susceptible to various modifications, changes and adaptations, and the same are intended to be comprehended within the meaning and range of equivalents of the appended claims.

What is claimed is:

1. In a method for de-icing aircraft surfaces by means of a plurality of electrical resistance heaters which are sequentially supplied with heating current, the delivery of current to each heater being effectuated during a succession of cycles each constituted by a heating period during which heating current is supplied to the heater and a nonheating period during which no current is supplied to the heater, thereby controlling the average current supplied to the heater, the improvement comprising controlling the duration of each period of a cycle by the steps of: measuring the temperature at the resistance heaters; measuring the water vapor content of the atmosphere surrounding the aircraft; adjusting the length of the heating period of each heater during each cycle as a function of the measured temperature at the resistance heaters, and adjusting the length of the nonheating period for each heater during each cycle as a function of the measured water vapor content.

2. A method as defined in claim 1 wherein said step of measuring the water vapor content is effectuated by an ice warning system.

3. A method as defined in claim 1 wherein: said step of measuring the temperature comprises producing an electrical signal representative of the temperature at the resistance heaters; said step of measuring the water vapor content comprises producing an electrical signal representative of the water vapor content of the atmopshere surrounding the aircraft; said step of adjusting the length of the heating period is carried out automatically in response to the value of the signal representative of the temperature; and said step of adjusting the length of the nonheating period is carried out automatically in response to the value of the signal representative of the water vapor content.

4. A method as defined in claim 3 wherein said step of adjusting the length of the nonheating period comprises varying the length of the nonheating period in response to changes in the value of the electrical signal representative of water vapor content in a direction to reduce the length of the nonheating period upon the occurrence of a signal value change representing an increase in the atmospheric water vapor content.

* * * * *